(12) United States Patent
McBrearty et al.

(10) Patent No.: US 7,076,632 B2
(45) Date of Patent: Jul. 11, 2006

(54) FAST PAGING OF A LARGE MEMORY BLOCK

(75) Inventors: Gerald Francis McBrearty, Austin, TX (US); Mark Douglass Rogers, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 320 days.

(21) Appl. No.: 10/687,252

(22) Filed: Oct. 16, 2003

(65) Prior Publication Data

US 2005/0086442 A1 Apr. 21, 2005

(51) Int. Cl.
*G06F 12/00* (2006.01)

(52) U.S. Cl. .................. 711/202; 711/203; 711/209

(58) Field of Classification Search .............. None
See application file for complete search history.

(56) References Cited

U.S. PATENT DOCUMENTS

| 4,730,249 | A | 3/1988 | O'Quinn, II et al. ....... 364/200 |
|---|---|---|---|
| 5,058,003 | A | 10/1991 | White ....................... 364/200 |
| 5,392,415 | A | 2/1995 | Badovinatz et al. ........ 395/425 |
| 5,446,854 | A | 8/1995 | Khalidi et al. ............. 395/401 |
| 5,652,873 | A | 7/1997 | Fecteau et al. ............ 395/500 |
| 5,721,858 | A | 2/1998 | White et al. ................ 395/413 |
| 5,796,978 | A | 8/1998 | Yoshioka et al. .......... 395/416 |
| 5,835,925 | A | 11/1998 | Kessler et al. ................ 711/2 |
| 5,860,144 | A | 1/1999 | Frank et al. ................ 711/206 |
| 5,940,868 | A | 8/1999 | Wagner ..................... 711/203 |
| 6,119,214 | A | 9/2000 | Dirks .......................... 711/206 |
| 6,233,666 | B1 | 5/2001 | Mathews et al. ........... 711/203 |
| 6,295,591 | B1 * | 9/2001 | Bealkowski et al. ........ 711/165 |
| 6,467,048 | B1 * | 10/2002 | Olarig et al. .................. 714/7 |
| 6,601,135 | B1 | 7/2003 | McBrearty et al. ......... 711/112 |
| 6,883,063 | B1 * | 4/2005 | Blumenau et al. .......... 711/113 |
| 2003/0005257 | A1 | 1/2003 | Wilson et al. .............. 711/205 |
| 2003/0097536 | A1 | 5/2003 | Atherton et al. ............ 711/170 |
| 2004/0162940 | A1 * | 8/2004 | Yagisawa et al. ........... 711/114 |

OTHER PUBLICATIONS

Free Online Dictionary of Computing (FOLDOC) definition of "swap file".*

* cited by examiner

*Primary Examiner*—Mano Padmanabhan
*Assistant Examiner*—Paul Baker
(74) *Attorney, Agent, or Firm*—Marilyn S. Dawkins; Amy J. Pattillo

(57) ABSTRACT

A method, system, and program for fast paging of a large memory block are provided. A request to physically remove a memory block device from a data processing system is received. A logical volume within disk space is dynamically allocated for a contiguous paging space. Multiple logical pages for the memory block devices are translated into multiple physical addresses for the memory block device. A single input/output request is issued to page out data located at the multiple physical addresses to the contiguous paging space, such that after the single request is complete, the memory block device can be safely removed. Further, when a replacement memory block device is detected, a single input/output request is issued to page in data located within the contiguous paging space to the replacement memory block.

17 Claims, 4 Drawing Sheets

FAST PAGING OF A LARGE MEMORY BLOCK

BACKGROUND OF THE INVENTION

1. Technical Field

The present invention relates in general to improved data processing systems and in particular to improved memory management in a data processing system. Still more particularly, the present invention relates to fast paging of a large memory block within a data processing system.

2. Description of the Related Art

A standard computer system includes one or more central processing units (CPU), one or more levels of caches, one or more memory devices, and input/output (I/O) mechanisms all interconnected via an interconnection of buses and bridges. In addition to the major hardware components, a major software (or firmware) component of a computer system is an Operating System (OS). Applications running on a computer system interact with the OS.

Typically, the OS is responsible for allocating and deallocating memory within the computer system. Virtual memory allows an OS to support a very large set of addresses that can be allocated and deallocated. Usually, the set of addresses is referred to as the address space and is divided into pages.

The address space typically includes random access memory (RAM) and disk space accessible from input/output (I/O) devices. It is common to swap pages out of RAM onto disk space and swap pages into RAM from disk space. Typically, to swap a page of memory, the virtual address referring to the page must be translated into a physical address. Then, an I/O request is sent to either page in or page out the page.

In some data processing systems, such as servers, which include a large number of memory devices, these memory devices may require removal or replacement. Further, additional memory devices may be added in a server to maintain or increase the performance of the system. Changing the memory devices in a server may be referred to as Dynamic Reconfiguration (DR).

An efficient server architecture should allow for ease in the physical replacement or addition of memory and other hardware to the server system. However, often in the case of memory replacement, before the memory can be physically replaced, the data stored in memory must be paged out to disk space. Performing a page out for each individual page of a large memory block is not efficient. Thus, it would be advantageous for a server to not only include an efficient architecture for physical replacement of hardware, but for an operating system to control the memory of the server to perform fast paging out of memory for replacement. Additionally, when the new memory is recognized, it is often imperative to page data in to the memory and resume use of that memory location as quickly as possible. Thus, it would be advantageous to provide a method, system, and program for fast paging in and out of a memory block the size of a memory device for efficient replacement or addition of that memory device.

SUMMARY OF THE INVENTION

In view of the foregoing, it is therefore an object of the present invention to provide an improved data processing system.

It is another object of the present invention to provide improved memory management in a data processing system.

It is yet another object of the present invention to provide a method, system and program for fast paging of a large memory block within a data processing system.

According to one aspect of the present invention, a request to physically remove a memory block device from a data processing system is received. Multiple logical pages for the memory block devices are translated into multiple physical addresses for the memory block device. A single request is issued to page out data located at the multiple physical addresses to a contiguous paging space within a disk space accessible to the data processing system, such that after the single request is complete, the memory block device can be safely removed. The single request may be a single direct memory access request to page out the multiple physical addresses to the contiguous paging space.

According to a preferred embodiment of the present invention, the multiple logical pages are translated by first creating a memory map of multiple virtual memory addresses to the physical pages of the memory block device. Next, a list of the physical pages is pretranslated from the memory map, such that only a single request is required to page out data located at the multiple physical addresses.

According to another aspect of the present invention, a contiguous paging space of a size able to hold all the data located at the multiple physical addresses of the large memory block is required. If a large enough contiguous paging space is not available, then the contiguous paging space must be created. In particular, for the contiguous paging space, either a new logical volume is dynamically allocated that provides a large enough contiguous paging space or an existing logical volume is used to create the temporary paging space. After a page out to a new contiguous space is complete, the paging space is marked as page in only. Additionally, after a page in from the newly created paging space is complete, the data is deallocated. Once all pages have been paged in from the paging space, that paging space is deleted from the logical volume within the disk space.

According to yet another aspect of the present invention, a replacement memory block device is detected. The replacement memory block device is configured. If an aggressive page in is required to the replacement memory block device, then multiple logical pages for the contiguous paging space are translated into multiple physical addresses for the contiguous paging space. Next, a single request is issued to page in data located at the multiple physical addresses into the replacement memory block device. In particular, an aggressive page in may also be required when a failing disk space is detected.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
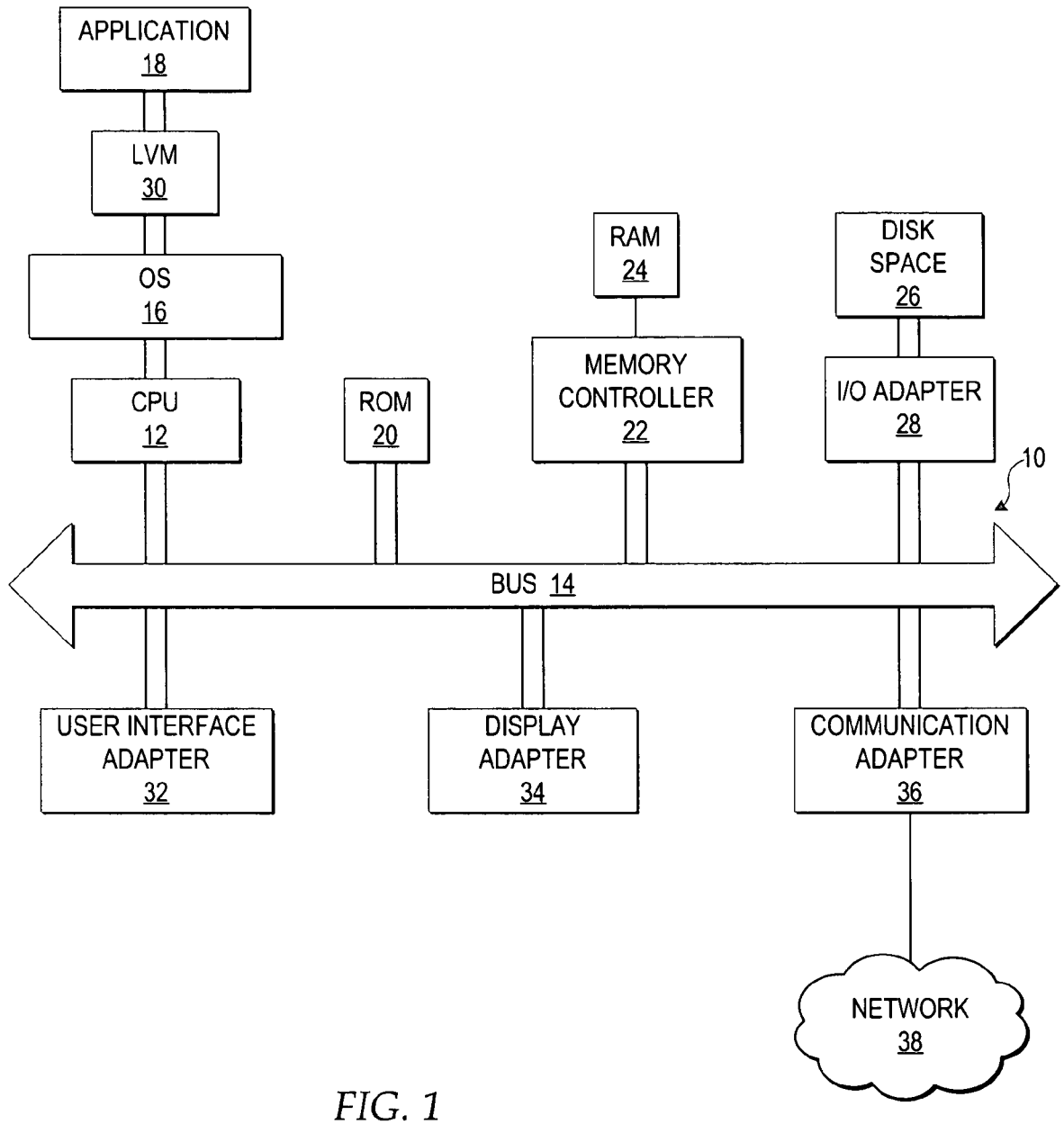
FIG. 1 is a block diagram depicting a computer system in which the present method, system, and program may be implemented.

Referring now to the drawings and in particular to FIG. 1, there is depicted one embodiment of a computer system in which the present method, system, and program may be implemented. The present invention may be executed in a variety of systems, including a variety of computing systems and electronic devices under a number of different operating systems. In general, the present invention is executed in a computer system that performs computing tasks such as manipulating data in storage that is accessible to the computer system.

Computer system 10 includes a bus 14 or other communication device for communicating information within computer system 10, and at least one processing device such as central processing unit (CPU) 12, coupled to bus 14 for processing information. Bus 14 preferably includes low-latency and higher latency paths that are connected by bridges and adapters and controlled within computer system 10 by multiple bus controllers. When implemented as a server system, computer system 10 typically includes multiple processors designed to improve network servicing power.

CPU 12 may be a general-purpose processor such as IBM's PowerPC™ processor that, during normal operation, processes data under the control of an operating system (OS) 16 and application software 18 accessible from a dynamic storage device such as random access memory (RAM) 24 and a static storage device such as Read Only Memory (ROM) 20. OS 16 preferably controls the allocation and deallocation of memory within computer system 10. In a preferred embodiment, OS 16 contains machine executable instructions that when executed on processor 12 carry out the operations depicted in the flowcharts of FIGS. 3 and 4, and others described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 10 to perform a process according to the present invention. The term "machine-readable medium" as used herein includes any medium that participates in providing instructions to CPU 12 or other components of computer system 10 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 10 can read and which is suitable for storing instructions. In the present embodiment, an example of a non-volatile medium is disk space 26 which as depicted is an internal component of computer system 10, but will be understood to also be provided by an external device. Volatile media include dynamic memory such as RAM 24. Transmission media include coaxial cables, copper wire or fiber optics, including the wires that comprise bus 14. Transmission media can also take the form of acoustic or light waves, such as those generated during radio frequency or infrared data communications.

Moreover, the present invention may be downloaded as a computer program product, wherein the program instructions may be transferred from a remote computer such as a server to requesting computer system 10 by way of data signals embodied in a carrier wave or other propagation medium via a network link (e.g., a modem or network connection) to a communications adapter 36 coupled to bus 14. Communications adapter 36 provides a two-way data communications coupling to a network link that may be connected, for example, to a local area network (LAN), wide area network (WAN), or directly to an Internet Service Provider (ISP). In particular, the network link may provide wired and/or wireless network communications to one or more networks, such as network 38. Network 102 may refer to the worldwide collection of networks and gateways that use a particular protocol, such as Transmission Control Protocol (TCP) and Internet Protocol (IP), to communicate with one another. Network 102 uses electrical, electromagnetic, or optical signals that carry digital data streams. The signals through the various networks and the signals through communication interface 32, which carry the digital data to and from computer system 10, are exemplary forms of carrier waves transporting the information.

A memory controller 22 interfaces with bus 14 to control the memory within computer system 10. OS 16 preferably determines which portions of memory to allocate and deallocate and sends commands that are then implemented within the memory by memory 20 controller 22. In particular, where OS 16 supports a virtual memory system, the memory system includes both RAM 24 and disk space 26. RAM 24 preferably includes multiple memory blocks and for purposes of the present invention preferably includes multiple logical memory blocks, such as 256 mega-byte (MB) dynamic RAMs (DRAM). According to the present invention, a single I/O request is made to page out or page in the data for an entire large memory block.

An I/O adapter 28 interfaces with bus 14 to control disk space 26. Disk space 26 may include multiple types of non-volatile memory accessible from multiple types of I/O devices including, but not limited to, direct access storage devices (DASD). Disk space 26 is partitioned into multiple logical volumes by a logical volume manager (LVM) 30. LVM 30 may be regarded as being made up of a set of operating system commands, library subroutines, or other tools that allow a user to establish and control logical volume storage. A logical partition maintained by LVM 30 may include several direct access storage devices, but to the applications the logical partition appears as a single storage device. Each logical volume is further divided into multiple pages. Each page represents a block of memory of fixed or variable size. LVM 30 controls the physical storage system resources by mapping data between a simple and flexible logical view of storage space and the actual physical storage system. LVM 30 does this by using a layer of device driver code that runs above traditional device drivers. As depicted, LVM 30 is located between OS 16 and application 18, however in alternate embodiments, LVM 30 may be incorporated within OS 16 or another component of computer system 10.

When implemented as a server system, computer system 10 typically includes multiple communication interfaces accessible via multiple peripheral component interconnect (PCI) bus bridges connected to an input/output controller. In this manner, computer system 10 allows connections to multiple network computers.

Further, multiple peripheral components may be added to computer system 10, connected to multiple controllers, adapters, and expansion slots coupled to one of the multiple levels of bus 14. For example, a user interface adapter 32 connectively enabled on bus 14 provides an interface for a keyboard and cursor control device, such as a mouse, trackball, or cursor direction keys. In addition, a display adapter 34 is connectively enabled on bus 14 for provide an interface for connecting a monitor or other display for providing visual, tactile, or other graphical representation formats. In alternate embodiments of the present invention, additional input and output peripheral adapters and components may be added.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

Figure 2:
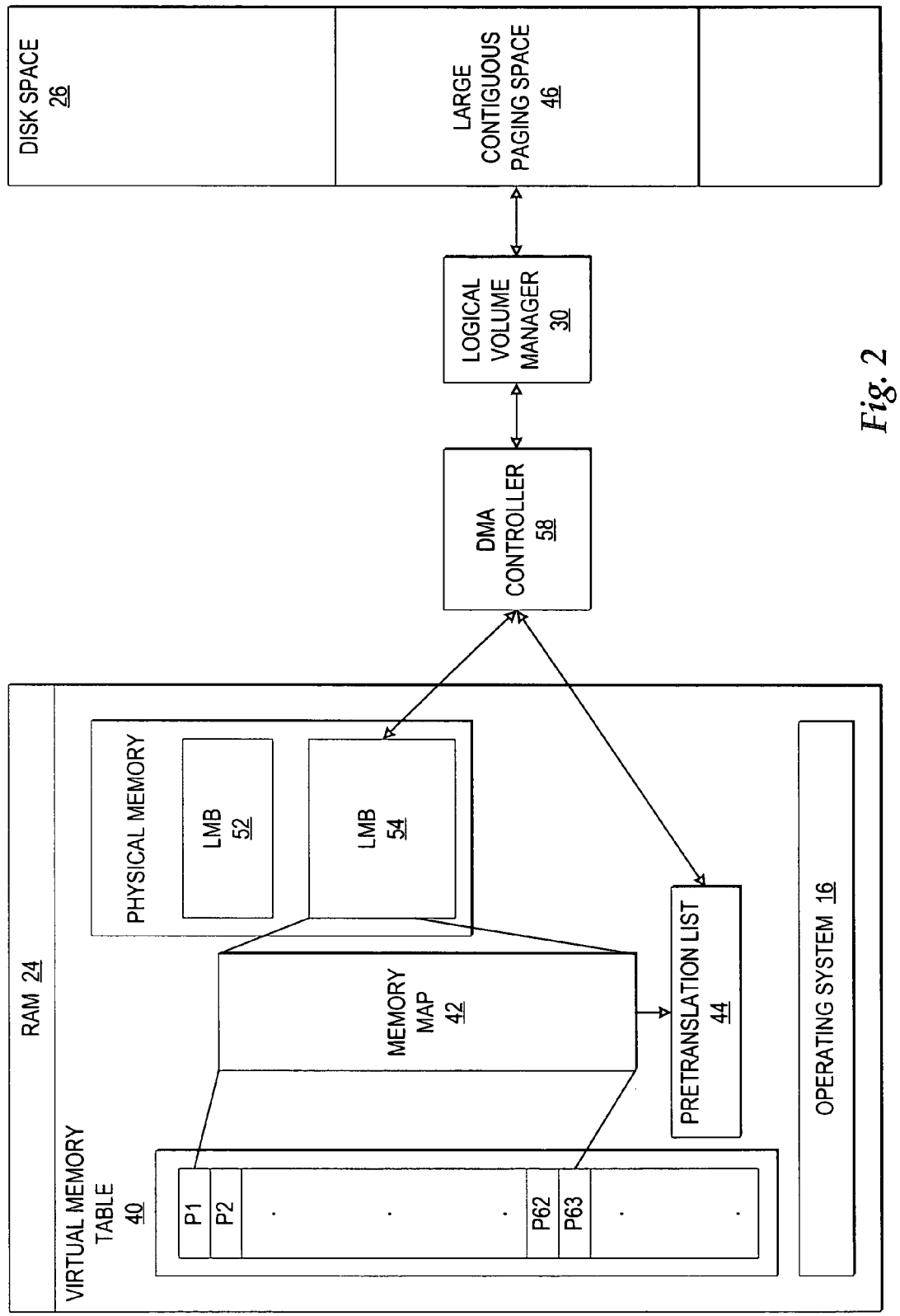
FIG. 2 is a block diagram depicting a memory system of a server provided for fast paging of a large block of memory in accordance with the method, system, and program of the present invention.

With reference now to FIG. 2, there is depicted a block diagram of the memory system of a server provided for fast paging of a large block of memory in accordance with the method, system, and program of the present invention. As illustrated, multiple types of data are stored in RAM 24. In an alternate embodiment, the data stored in RAM 24 may be stored in a cache or in disk space 26.

First, OS 16 is operating within RAM 24. OS 16 may be physically located within a portion of RAM 24. Alternatively, only those processes of OS 16 currently required may be physically located within a portion of RAM 24 while the remainder of the processes of OS 16 may be located within disk space 26.

The memory system of computer system 10 includes RAM 24 and disk space 26. OS 16 views the memory system of computer system 10 as logical units or pages of multiple bytes of memory. In particular, through virtual memory table 40, RAM 24 is expanded via disk space 26 and other secondary storage, so as to transparently appear to have more available memory. In such a virtual memory, the location of data is specified on a logical page of virtual memory table 40, rather than by the physical location of the data. As those processes required to run an application are requested, if the requested pages are not located in RAM 24, then the requested pages are read into RAM 24 from disk space 26.

The writing of pages of data from RAM 24 to disk space 26 is called a page out. For purposes of the present invention, during dynamic reconfiguration (DR), it is advantageous to page out data from an entire logical memory block (LMB), such as LMB 54, to a location within disk space 26 prior to physically removing LMB 54 from the computer system. Additionally, reading pages of data into RAM 24 from disk space 26 is called a page in. For purposes of the present invention, it is advantageous to page in data from disk space into a new LMB. For purposes of illustration, LMB 52 and LMB 54 are each 256 mega-byte (MB) of volatile memory located in ports for ease of removal and replacement. Although not depicted, additional types and sizes of memory may be located within RAM 24.

Since OS 16 views the memory system of computer system 10 as logical units, a memory map 42 is created and updated that describes the logical pages mapped to LMB 54 and all other data stored at other data locations. Memory map 42 stores the map of the logical pages (for example logical pages P1–P63) from virtual memory table 40) to the physical pages within LMB 54. Memory map 42 may be organized in multiple formats, such as a cross memory descriptor list or a scatter gather list.

For purposes of a large page out or large page in, a pretranslation list 44 is created from the real page numbers (rpn) stored within memory map 42 to be paged in or paged out. By creating pretranslation list 44 prior to a DMA request, when the DMA is made, the real page numbers are already looked up and can be transferred in a single I/O request.

For a fast page out of a large memory block, such as LMB 54, disk space 26 is searched for a large contiguous paging space 46. Large contiguous paging space 46 should be large enough to fit the data from LMB 54. In particular, to implement a temporary paging space for large contiguous paging space 46, an existing logical volume of paging space within disk space 26 may be available. If, however, no contiguous paging space is large enough to fit the data from LMB 54, then large contiguous paging space 46 must be created. In particular, OS 16 may request that LVM 30 create large contiguous paging space 46 from physical disk space 26. LVM 30 then dynamically creates a new logical volume from disk space 26 for temporary large contiguous paging space 46. In particular, LVM 30 arranges the physical storage systems of disk space 26 into volume groups in order to give the impression that a logical volume is a single voluminous disk space. Each logical volume in a logical volume group is divided into logical partitions. Likewise, each physical volume in a volume group is divided into physical partitions. Each logical partition corresponds to at least one physical partition. But, although the logical partitions in a logical volume are numbered consecutively or appear to be contiguous to each other, the physical partitions to which they each correspond, need not be contiguous to each other. And indeed, most often, the physical partitions are not contiguous to each other. Thus, one of the many tasks of LVM 30 monitors is the location of each physical partition that corresponds to a logical partition.

Once large contiguous paging space 46 is designated and pretranslation list 44 created, then a single I/O request is made for a page out of the data in LMB 54. In particular, the I/O request is preferably a DMA request controlled by a DMA controller 58 within the memory controller of computer system 10. DMA controller 58 accesses LMB 54 from pretranslation list 44 and transfers the data to LVM 30 in a single I/O request. LVM 30 may break up the large memory block of data into pages of data for storage in large contiguous paging space 46 within disk space 26.

Once logical volume manager 30 completes the page out into disk space 26, it returns a single done signal to DMA controller 58. DMA controller 58 then returns a single I/O complete signal to the OS 16. If large contiguous paging space 46 was created for this page out, then the paging space is marked as page in only. Additionally, memory map 42 is updated with the physical addresses of the location of the page out at large contiguous paging space 46.

It is often advantageous to deallocate an LMB quickly so that the LMB can be replaced. If an LMB is to be replaced, a process similar to the one used to page the data pages back into the new LMB, is now used to page out the data pages from the old LMB. In particular, once the new memory is configured, if an aggressive page in is requested, then before issuing a large page in, any pages in contiguous paging space 46 that are already demanded by an application are read back into contiguous paging space 46. A memory map and pretranslation list are created. Then, DMA controller 58 sends a request to page in all the data from contiguous paging space 46 into LMB 54. Once the page in is complete, contiguous paging space 46 can be deactivated and the logical volume deleted from the page table maintained by logical volume manager 30.

Additionally, fast paging may be advantageous when portions or all of disk space 26 are detected as failing. A large fast page in from disk space 26 to available memory enables replacement of disk space 26 without loss of data. In particular, a large contiguous space in the virtual memory is searched for among both physical memory and any non-failing disk space.

Figure 3:
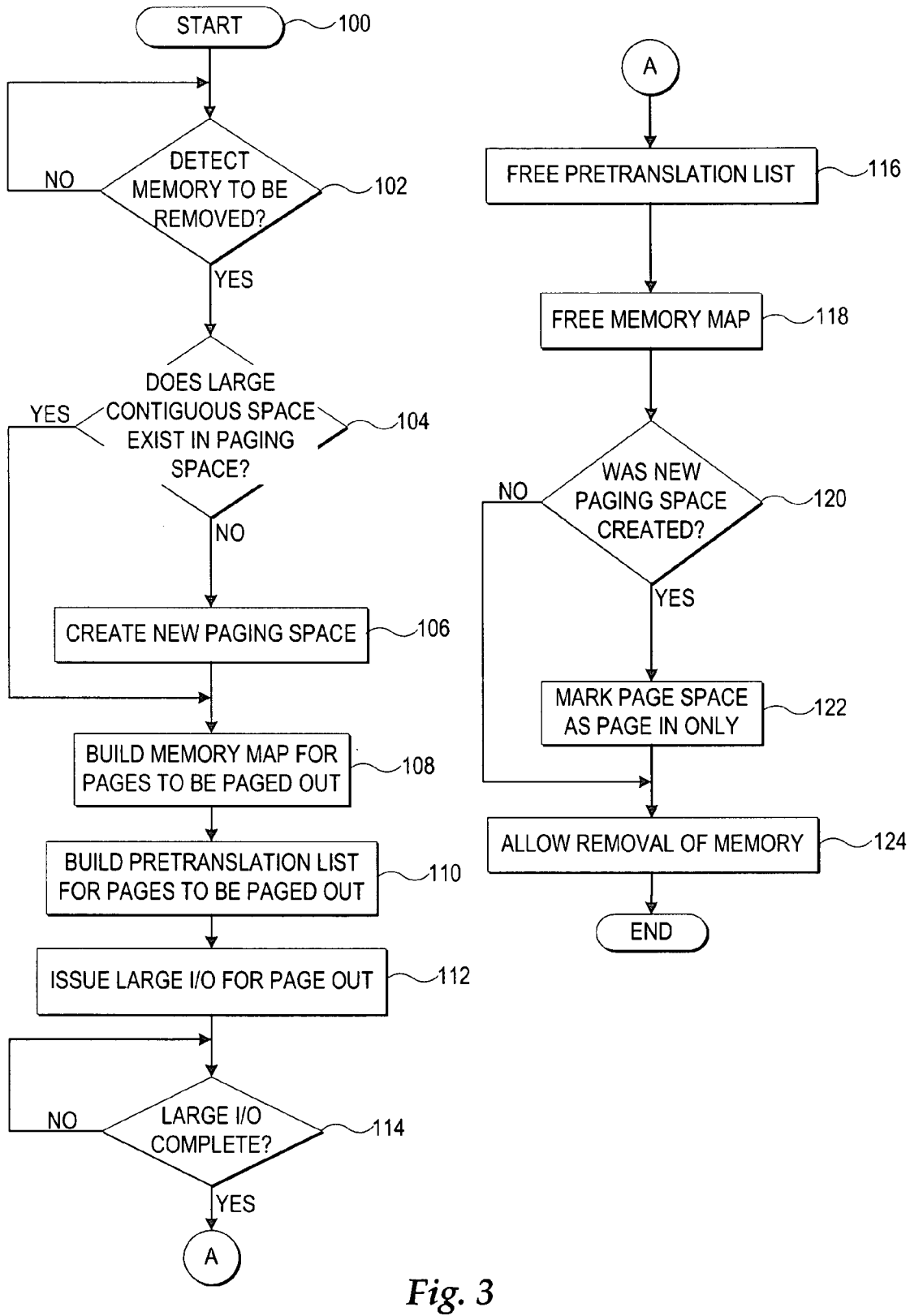
FIG. 3 is a high level logic flowchart of a process and program for for fast paging out of large memory blocks.

With reference now to FIG. 3, there is depicted a high level logic flowchart of a process and program for fast paging out of large memory blocks. As illustrated, the process starts at block 100 and thereafter proceeds to block 102. Block 102 depicts a determination whether memory is to be removed. A user may request to remove a logical memory block. Alternatively, memory may be configured such that the memory is allocated by the user for a period of time and when the period of time expires, removal of the memory is triggered. The process iterates at block 102 until memory, such as a LMB, is to be removed. Once the memory is to be removed, the process passes to block 104.

Block 104 depicts a determination of whether a large contiguous space exists in paging space. In particular, the large contiguous space should match the size of the data to be removed. If an existing logical volume large enough for the large contiguous space is available, then the existing logical volume is temporarily assigned to the large contiguous space. If there is a large contiguous space, then the process passes to block 108. If there is not a large contiguous space, then the process passes to block 106. Block 106 depicts creating the new paging space within the disk space. In particular, the logical volume manager dynamically creates a new logical volume for use as the large contiguous space. Then the process passes to block 108.

Block 108 illustrates building a memory map for the pages to be paged out. In particular, the pages are ordered within the memory map such that the pages projected to be needed first on a future page in will be grouped together at the beginning of the page space. Next, block 110 depicts building a pretranslation list for the pages to be paged out. Thereafter, block 112 illustrates issuing a large I/O for the page out. Advantageously, rather than issuing an individual I/O for each page of the large memory block to be removed, a single I/O request is sent for the entire block of pages within the pretranslation list. The logical volume manager may still have to break up the I/O request by page for storage in the disk space, but an additional I/O request is not required for each page included in the large I/O and advantageously only a single iodone signals the completition of the I/O, rather than requiring an iodone signal for each page. Block 114 depicts a determination of whether the large I/O request is complete. The process iterates at block 114 until the large I/O request is complete. Then the process passes to block 116.

Block 116 depicts freeing the pre-translation list. Next, block 118 illustrates freeing the memory map. Thereafter, block 120 depicts a determination as to whether new paging space was created at a previous step in the process depicted at block 106. If new paging space was not created, then the process passes to block 124. If new paging space was created, then the process passes to block 122. Block 122 depicts marking the new paging space as page in only. Thereafter, block 124 illustrates allowing removal of the memory, and the process ends. Removal of the memory may include deconfiguration and logical or physical removal of the memory.

Figure 4:
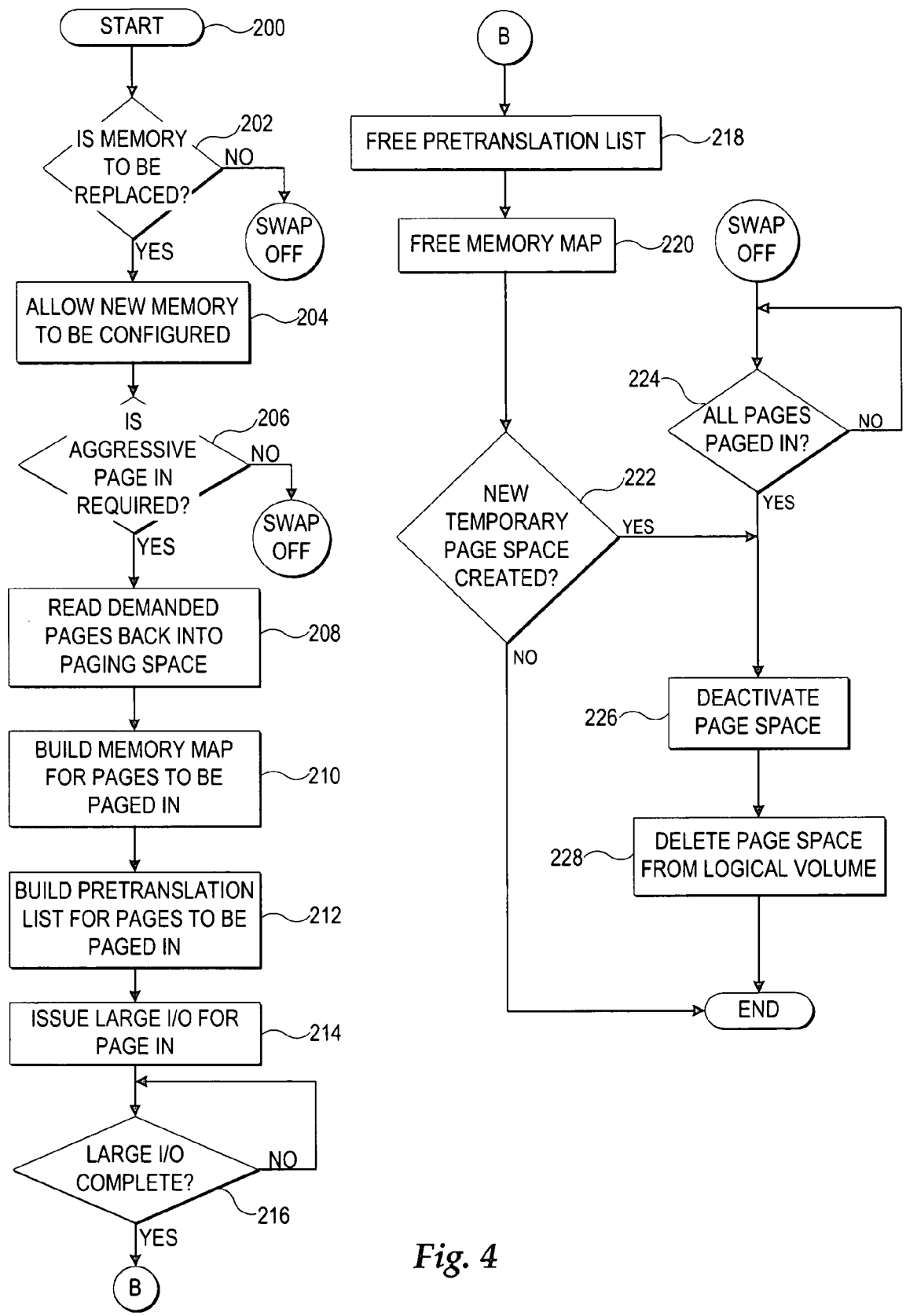
FIG. 4 is a high level logic flowchart of a process and program for fast paging in of large memory blocks.

Referring now to FIG. 4, there is illustrated a high level logic flowchart of a process and program for fast paging in of large memory blocks. As depicted, the process starts at block 200 and thereafter proceeds to block 202. Block 202 illustrates a determination whether a memory is to be replaced. Memory may be replaced physically with a new memory block or logically by allocating a new memory location. Alternatively, the operating system may detect a failing page space and automatically trigger a fast page in to a memory block. If a memory is not to be replaced, then the process passes to block 224, a process for swapping off. If a memory is to be replaced, then the process passes to block 204.

Block 204 illustrates allowing the new memory to be configured. Thereafter, block 206 depicts a determination whether an aggressive page in is required. If an aggressive page in is not required, then the process passes to block 224, a process for swapping off. If an aggressive page in is required, then the process passes to block 208.

Block 208 depicts reading any specific pages demanded by an application back into the paging space. These pages will be discarded and read in again during the large I/O page in. Next, block 210 illustrates building a memory map for the pages to be paged in. Thereafter, block 212 depicts building a pretranslation list for the pages to be paged in. Next, block 214 illustrates issuing a large I/O for the page in. Thereafter, block 216 depicts a determination whether the large I/O is completed. Once the large I/O is completed, the process passes to block 218. Block 218 depicts freeing the pretranslation list. Next, block 220 illustrates freeing the memory map. Thereafter, block 222 depicts a determination whether a new temporary paging space was created for the fast page out process depicted in FIG. 3. If a new temporary paging space was not created, then the process ends. If a new temporary paging space was created, then the process passes to block 224.

The swapping off process starting at block 224 may be performed as a background process or follow the other processes illustrated. Block 224 illustrates a determination whether all the pages have been paged in from that temporary page space. Once all the pages have been paged in, the process passes to block 226. Block 226 depicts deactivating the page space. Next block 228 illustrates deleting the page space from the logical volume, and the process ends.

While the invention has been particularly shown and described with reference to a preferred embodiment, it will be understood by those skilled in the art that various changes in form and detail may be made therein without departing from the spirit and scope of the invention.

What is claimed is:

1. A method for fast paging of a memory block during memory block removal from a data processing system, comprising:

receiving a request to physically remove a memory block device from said data processing system;

translating a plurality of logical pages for said memory block device into a plurality of physical addresses for said memory block device; and issuing a single direct memory access request to page out data located at said plurality of physical addresses to a contiguous paging space within a disk space accessible to said data processing system, such that after said single request is complete said memory block device can be removed.

2. The method of claim 1 for fast paging of a memory block further comprising:
mapping said plurality of logical pages for said memory block to a plurality of physical pages for said memory block device.

3. The method of claim 1 for fast paging of a memory block further comprising:
detecting whether a logical volume allocable for said contiguous paging space of a size able to hold all said data located at said plurality of physical addresses exists in said disk space;
responsive to detecting said logical volume allocable for said contiguous paging space of a size able to hold all said data, temporarily allocating said logical volume for said contiguous paging space; and
responsive to not detecting said logical volume allocable for said contiguous paging space, dynamically creating a new logical volume for said contiguous paging space of a size able to hold all said data located at said plurality of physical addresses.

4. The method of claim 1 for fast paging of a memory block further comprising:
receiving said request to physically remove said memory block device, wherein said memory block device is a failing disk space;
issuing said single request to page in data located at said plurality of physical addresses to a contiguous memory space within at least one of a random access memory and a disk space accessible to said data processing system, such that after said single request is complete said failing page space is removable.

5. The method of claim 1 for fast paging of a memory block further comprising:
detecting a replacement memory block device;
pretranslating a plurality of logical pages for said contiguous paging space into a plurality of physical addresses for said contiguous paging space, and
issuing a single request to page in data located at said plurality of physical addresses to said replacement memory block device, such that only two input/output requests are required for large memory block replacement.

6. The method of claim 1 for fast paging of a memory block further comprising:
responsive to detecting that said single request is complete:
deactivating a logical volume temporarily allocated for said contiguous paging space; and
deleting said contiguous paging space from said disk space.

7. A data processing system comprising:
an operating system;
a processor that executes instructions of said operating system;
a memory comprising a plurality of memory blocks interconnected to said processor;
a disk space accessible to said processor;
means for enabling removal of a particular memory block from among said plurality of memory blocks by:
translating a plurality of logical pages for said particular memory block into a plurality of physical addresses for said particular memory block; and
issuing a single direct memory access request to page out data located at said plurality of physical addresses to a contiguous paging space within said disk space, wherein after said single request is complete safe removal of said particular memory block is enabled.

8. The data processing system of claim 7, further comprising:
means for mapping said plurality of logical pages for said memory block to a plurality of physical pages for said particular memory block.

9. The data processing system of claim 7, further comprising:
means for detecting whether a logical volume allocable for said contiguous paging space of a size able to hold all said data located at said plurality of physical addresses exists in said disk space;
means responsive to detecting said logical volume allocable for said contiguous paging space of a size able to hold all said data, for temporarily allocating said logical volume for said contiguous paging space; and
means responsive to not detecting said logical volume allocable for said contiguous paging space, for dynamically creating a new logical volume for said contiguous paging space of a size able to hold all said data located at said plurality of physical addresses.

10. The data processing system of claim 7, wherein said memory block device is a failing disk space and said single request is to page in data located at said plurality of physical addresses of said failing disk space to a contiguous memory space within at least one of a random access memory and a disk space accessible to said data processing system.

11. The data processing system of claim 7, further comprising:
means for detecting a replacement memory block;
means for translating a plurality of logical pages for said contiguous paging space into a plurality of physical addresses for said contiguous paging space; and
means for issuing a single request to page in data located at said plurality of physical addresses to said replacement memory block.

12. The data processing system of claim 7, further comprising:
means, responsive to detecting that said single request is complete, for:
deactivating a logical volume temporarily allocated for said contiguous paging space; and
deleting said contiguous paging space from said disk space.

13. A computer program product for selectively displaying mirrored addresses in a communication, comprising:
a computer readable medium; and
program instructions on said computer readable medium for:
receiving a request to physically remove a memory block device from said data processing system;
translating a plurality of logical pages for said memory block device into a plurality of physical addresses for said memory block device; and
issuing a single direct memory access request to page out data located at said plurality of physical addresses to a contiguous paging space within a disk space accessible to said data processing system, such that after said single request is complete said memory block device can be removed.

14. The computer program product of claim 13, further comprising program instructions for:

mapping said plurality of logical pages for said memory block to a plurality of physical pages for said memory block device.

15. The computer program product of claim 13, further comprising program instructions for:
    detecting whether a logical volume allocable for said contiguous paging space of a size able to hold all said data located at said plurality of physical addresses exists in said disk space;
    temporarily allocating said logical volume for said contiguous paging space, responsive to detecting said logical volume allocable for said contiguous paging space of a size able to hold all said data; and
    dynamically creating a new logical volume for said contiguous paging space of a size able to hold all said data located at said plurality of physical addresses, responsive to not detecting said logical volume allocable for said contiguous paging space.

16. The computer program product of claim 13, further comprising program instructions for:
    receiving said request to physically remove said memory block device, wherein said memory block device is a failing disk space;
    issuing said single request to page in data located at said plurality of physical addresses to a contiguous memory space within at least one of a random access memory and a disk space accessible to said data processing system, such that after said single request is complete said failing page space is removable.

17. The computer program product of claim 13, further comprising program instructions for:
    detecting a replacement memory block device;
    translating a plurality of logical pages for said contiguous paging space into a plurality of physical addresses for said contiguous paging space; and
    issuing a single request to page in data located at said plurality of physical addresses to said replacement memory block device.

* * * * *